United States Patent [19]
Young

[11] Patent Number: 6,079,022
[45] Date of Patent: Jun. 20, 2000

[54] METHOD AND APPARATUS FOR DYNAMICALLY ADJUSTING THE CLOCK SPEED OF A BUS DEPENDING ON BUS ACTIVITY

[75] Inventor: Bruce Young, Tigard, Oreg.

[73] Assignee: Intel Corporation, Santa Clara, Calif.

[21] Appl. No.: 08/728,716

[22] Filed: Oct. 11, 1996

[51] Int. Cl.⁷ .................................................. G06F 13/00
[52] U.S. Cl. ........................ 713/300; 713/320; 713/322; 713/500; 713/501; 713/600; 713/601
[58] Field of Search ..................... 395/750.03, 750.04, 395/555, 556, 559, 560

[56] References Cited

U.S. PATENT DOCUMENTS

| | | | |
|---|---|---|---|
| 4,698,748 | 10/1987 | Juzswik et al. | 395/750.04 |
| 5,222,239 | 6/1993 | Rosch | 395/750.04 |
| 5,502,689 | 3/1996 | Peterson et al. | 368/156 |
| 5,502,824 | 3/1996 | Heil | 395/293 |
| 5,625,807 | 4/1997 | Lee et al. | 395/560 |
| 5,628,001 | 5/1997 | Cepuran | 395/556 |
| 5,628,019 | 5/1997 | O'Brien | 395/750.04 |
| 5,652,895 | 7/1997 | Poisner | 395/750.04 |
| 5,664,205 | 9/1997 | O'Brien et al. | 395/750.04 |

*Primary Examiner*—Ayaz R. Sheikh
*Assistant Examiner*—Rupal D. Dharia
*Attorney, Agent, or Firm*—Kenyon & Kenyon

[57] ABSTRACT

A dynamic clock control comprising an idle detector and a variable speed clock supply. The idle detector detects when an idle condition appears on the bus and sends an appropriate control signal to the variable speed clock supply. The clock supply, which supplies clocking signals for the bus components coupled to the bus, changes the frequency of the clocking signals from a faster, full-speed frequency to a lower frequency. When the bus becomes active, the idle detector causes the clock supply to supply clocking signals at the original full-speed frequency. With the apparatus and method of the present invention, the frequency of the clocking signals supplied to the bus components can be dynamically controlled without user intervention. Since for many bus components, power consumption is proportional to clocking frequency, a significant power savings is obtained for the overall bus system.

2 Claims, 4 Drawing Sheets

METHOD AND APPARATUS FOR DYNAMICALLY ADJUSTING THE CLOCK SPEED OF A BUS DEPENDING ON BUS ACTIVITY

BACKGROUND OF THE INVENTION

The present invention pertains to a method and apparatus for controlling the supplying of a clock signal to a bus. More particularly, the present invention pertains to providing dynamic control of the frequency of a clock signal supplied to a bus.

In a typical computer system, a plurality of components are coupled to one or more busses which provides a medium of communication between the components. An architecture for one such bus is the Peripheral Component Interconnect (PCI) standard (e.g., PCI Local Bus Specification, Version 2.1, PCI Special Interest Group, Portland, Oreg.). A typical PCI system is shown in FIG. 1.

In FIG. 1, a central processing unit (CPU) 1 is coupled to a host bus 3 having control, address and data lines. A first bridge circuit 5 (also referred to as a host/PCI bridge or north bridge) is coupled between the host bus 3 and the PCI bus 7. The first bridge circuit 5 is further coupled to a cache memory 9 and main memory 11. Coupled to the PCI bus are one or more PCI components such as a Small Computer Standard Interface (SCSI) Host Bus Adapter 13 (which in turn is coupled to a SCSI bus 14), a Local Area Network (LAN) Adapter 15 (which in turn is coupled to a LAN 16, an Expansion Bus bridge 17 (which in turn is coupled to an Expansion bus, such as an EISA bus 18), and a Graphics Adapter 19 (which in turn is coupled to a Video Frame Buffer 20).

In order for the PCI components to operate properly on the PCI bus 7, each must receive a substantially similar (i.e., in frequency and phase) clock signal. For this purpose, a clock control circuit 21 is provided which supplies a uniform clock signal "CLK" to each of the devices coupled to the PCI bus 7. In the system shown in FIG. 1, the clock control circuit 21 is external to the other components of the system. One skilled in the art will appreciate that the clock control circuit 21 can be an integral part of a component in the system (e.g., as part of the first bridge circuit 5).

There are several methods for controlling the clock signal in a system such as the PCI bus system of FIG. 1. In most systems, the clock control circuit 21 will supply a clock signal running at full speed at all times. Since power consumption is linearly proportional to switching frequency for Complementary Metal Oxide Semiconductor (CMOS) devices coupled to the bus, supplying a full speed clock at all times is energy inefficient.

Section 1 of the PCI Mobile Design Guide, Revision 1.0 (1994) describes a system where each device that is coupled to the PCI device uses a signal, CLKRUN# (the "#" indicates a negatively asserted signal), in a protocol for starting and stopping the clock signal. Referring to FIG. 2, a simple block diagram is provided showing a particular relationship between a bus master 31 (i.e., a component that is capable of initiating a data transfer with another device coupled to the bus), a bus target 32, and central resource 33 for controlling clock signals. The CLKRUN# signal is an input/output signal for each of the three components.

According to the CLKRUN# protocol, the central resource 33 keeps CLKRLUN# asserted when the clock is running normally. When the bus becomes idle, the central resource 33 deasserts CLKRUN# for one clock period and then monitors the CLKRUN# signal line thereafter. If CLKRUN# is not deasserted by any of the other devices coupled to the bus (i.e., master device 31 and target device 32) for at least four clock cycles, then the central resource 33 may stop the clock signal or run the clock at a lower frequency. In some instances, a target device 32 may need the clock to run at full speed so that it can complete some internal processes after a transaction on the bus has been completed.

While the clock is stopped or running at a lower frequency, a master device 31 seeking access to the bus will assert the CLKRUN# signal to notify the central resource 33 that a bus access is needed. In response to the CLKRUN# signal, the central resource 33 brings the clock to an operational frequency and keeps the CLKRUN# signal line asserted. The master device 31 then asserts a REQ# signal to request ownership of the bus. The central resource 33 then continues to keep the clock signal running at fall speed and the CLKRUN# signal asserted until the bus becomes idle.

A drawback to the use of the CLKRUN# protocol is that it is not a feature available on a PCI add-in connector. Also, if one component coupled to the PCI bus does not support the CLKRUN# protocol, then no device may use the protocol. Otherwise, the situation may arise where the clock is stopped, or slowed down and a master device has no way of signaling the central resource 33 to bring the clock up to fill speed. Accordingly, the CLKRUN# protocol is typically used in a "closed" system, such as in a mobile environment (e.g., a notebook computer) with careful selection of the devices coupled to the PCI bus. Another drawback of the CLKRUN# protocol is that each device coupled to the bus must have a pin dedicated to driving and receiving the CLKRUN# signal.

Another method for controlling the speed of the clock is through the use of software. In such a system, a user can select a frequency for the bus clock and then reset it at a later time. While this allows some control of the clock and provides some power savings for long periods of system idle times, it does not provide any power savings during normal system operation.

In view of the above, there is a need for a method and apparatus for dynamically controlling clock speed on a bus system that does not require human intervention or for each device to output and receive a special signal operating according to a rigid protocol.

SUMMARY OF THE INVENTION

According to the method and apparatus of the present invention, the frequency of the clocking signals supplied to bus components coupled to a bus is changed in dependence on the condition of the bus. When the bus is in an active condition, clocking signals are provided at a first frequency. When the bus is in an idle condition, the frequency is lowered to a second frequency. Accordingly, when the bus returns to an active condition, clocking signals are provided to the bus components at the first frequency. For detecting the idle/active conditions on the bus, an idle detector circuit is provided coupled to the bus. A variable speed clock supply is provided coupled to the idle detector circuit to supply clocking signals to the bus components.

The method and apparatus of the present invention are suitable for use with a bus operating according to the Peripheral Component Interconnect (PCI) architecture. When the PCI signals FRAME# and IRDY# are both deasserted, the bus is in an idle condition which is detected by the idle detector circuit. In response, the idle detector circuit sends a first control signal to the variable-speed clock supply circuit, which in turn changes the frequency of the clocking signals provided to the bus components to a lower value. After the bus is in an idle condition, the assertion of a REQ# signal by a bus master component (indicating the start of a bus transaction) causes the idle detector circuit to send a second control signal to the variable-speed clock supply circuit, which in turn changes the frequency of the clocking signals sent to the bus components to the higher, full-speed value. Furthermore, clocking signals provided by the variable-speed clock supply at first and second frequencies can be in-phase with one another. Preferably, the clocking signals at the second frequency are a divided down version of those at the first frequency (which is the normal PCI clock).

Using the method and apparatus of the present invention, the clocking signal frequency supplied to the bus components can be controlled dynamically without intervention by the user. Since many bus components consume power at a rate proportional to the clocking frequency, a significant amount of power savings is seen in the bus system.

DETAILED DESCRIPTION

Figure 3:
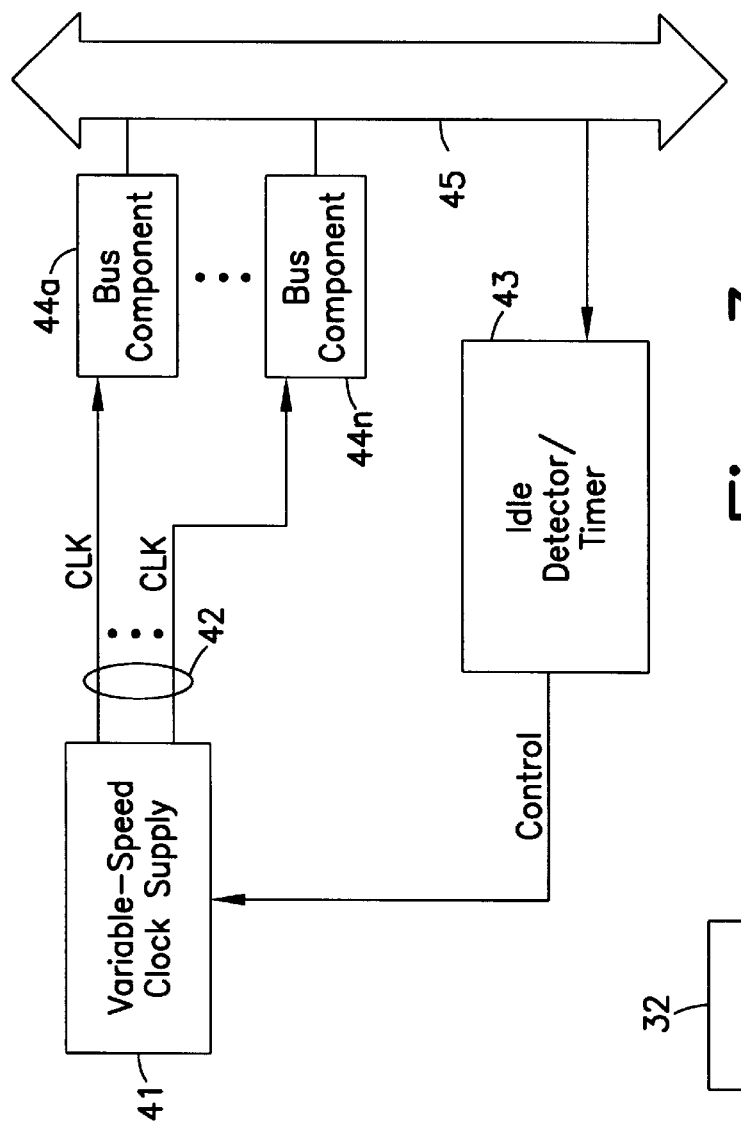
FIG. 3 is a general block diagram of the dynamic clock controller constructed according to the present invention.
Figure 2:
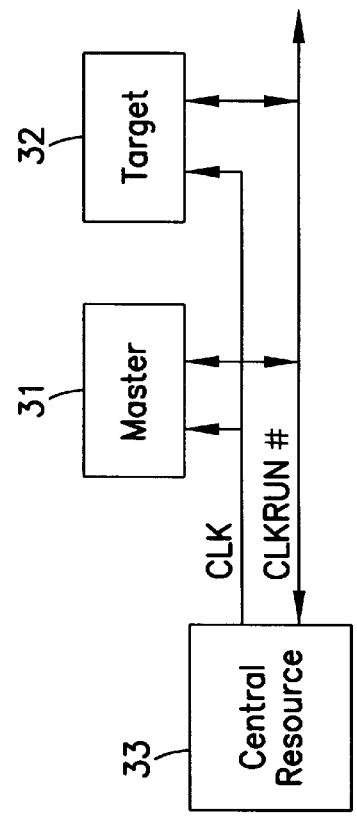
FIG. 2 is block diagram of a system utilizing the CLK-RUN# protocol as known in the art.

Referring to FIG. 3, a general block diagram of the dynamic clock controller of the present invention is shown. A variable speed clock supply component 41 is provided which supplies clock signals (CLK) to the components (e.g., bus components 44a . . . 44n) coupled to a bus 45 (e.g., such as a PCI bus). The variable speed clock supply component 41 controls the frequency of the CLK signal and can set it at full speed or at a lower frequency. If the CLK signal is set at a low frequency, or is stopped altogether, the bus components 44a . . . 44n consume less power. An idle detector circuit (e.g., the idle detector/timer component 43 of FIG. 3) is provided which detects when the bus 45 is idle (i.e., no transactions between bus components 44a . . . 44n are currently taking place on the bus). When the idle detector/timer component 43 detects that the bus is idle, a first control signal is sent to the variable speed clock supply component 31, which in turn reduces the frequency of the CLK signal to a lower value. Also, the idle detector/timer component 43 also detects when a transaction is desired or is about to occur on the bus 45. When this occurs, the idle detector/timer component 43 sends a second control signal to the variable-speed clock supply 41 causing the supply to increase the frequency of the clock to full speed.

Figure 4:
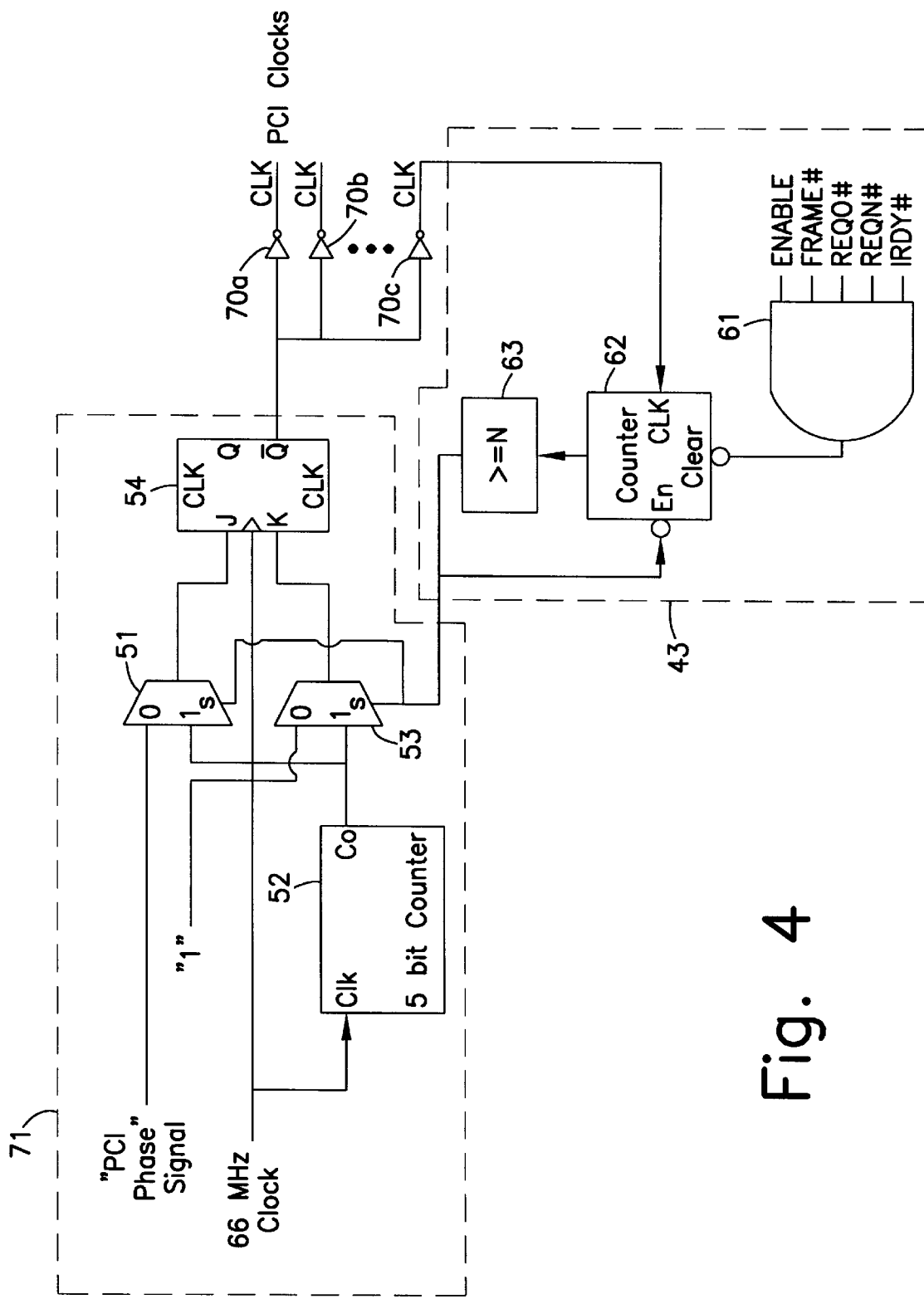
FIG. 4 is a block diagram of an embodiment of the dynamic clock controller constructed according to the present invention.

Referring to FIG. 4, an embodiment of the apparatus of FIG. 3 is shown. The variable-speed clock supply component 41 comprises a first multiplexer 51 having first and second inputs, a select input (S) and an output. The first input of the first multiplexer (0) is coupled to the "PCI Phase" signal which is a 33 MHZ clock signal. In many implementations of the PCI bus, a 33 MHZ bus clock signal is used for the devices coupled to the bus. The second input of the first multiplexer (1) is coupled to the output of a clock divider circuit 52. In this embodiment, the clock divider circuit 52 is a 5 bit counter which outputs a signal Co having a duration of one clock cycle (based on the Clk input to the counter) every time the 5-bit counter transitions from 11111 to 00000.

The first input (0) of the second multiplexer 53 is coupled to a "1" value while its second input (1) is coupled to the Co output of the clock divider circuit 52. The outputs of the first and second multiplexers 51, 53 are coupled to the J and K inputs, respectively, of a JK-type flip-flop 54, the Q output of the JK-type flip-flop 54 is coupled to a plurality of inverters 70a, 70b, . . . , 70n (which can also amplify the output) supplying the PCI Clock signals to the bus components coupled to the PCI bus (see FIG. 3). The JK-type flip-flop and the clock divider circuit 52 are clocked by a 66 MHZ clock signal, which has a frequency double that of the "PCI Phase" signal.

The select inputs (S) of the first and second multiplexers 51, 53 are coupled to an output of the idle detector/timer component 43. The idle detector/timer component 43 comprises an AND gate 61 which receives a plurality of signals from the PCI bus 45 (see FIG. 3). In this embodiment, the inputs of the AND gate are coupled to the FRAME# signal, the IRDY# signal, and a plurality of REQA signal lines of the PCI bus. The FRAME# signal typically indicates the overall duration of a burst transfer on the bus and is controlled by the bus component initiating the transfer. The assertion of the IRDY# signal by the bus component initiating the transfer indicates that it will remain active during the last data phase after the FRAME# signal is deasserted. Deassertion of the IRDY# signal by the bus initiator returns the PCI bus to its idle state. Each bus master component initiates a transfer on the bus by asserting its REQ# signal.

The output of the AND gate 61 is coupled to the Clear input of a counter circuit 62. The counter circuit 62 also has a Clk input which is coupled to the CLK output of one of the inverters (in this case inverter 70n). The counter value is output to a comparator 63 (labeled here as ">=N"). When the counter value from the counter 62 is greater than or equal to the value N, the comparator 63 asserts a signal at its output which becomes the select inputs to the first and second multiplexers 51, 53. The output of the comparator 63 is also coupled to the enable input of the counter 62.

Figure 5:
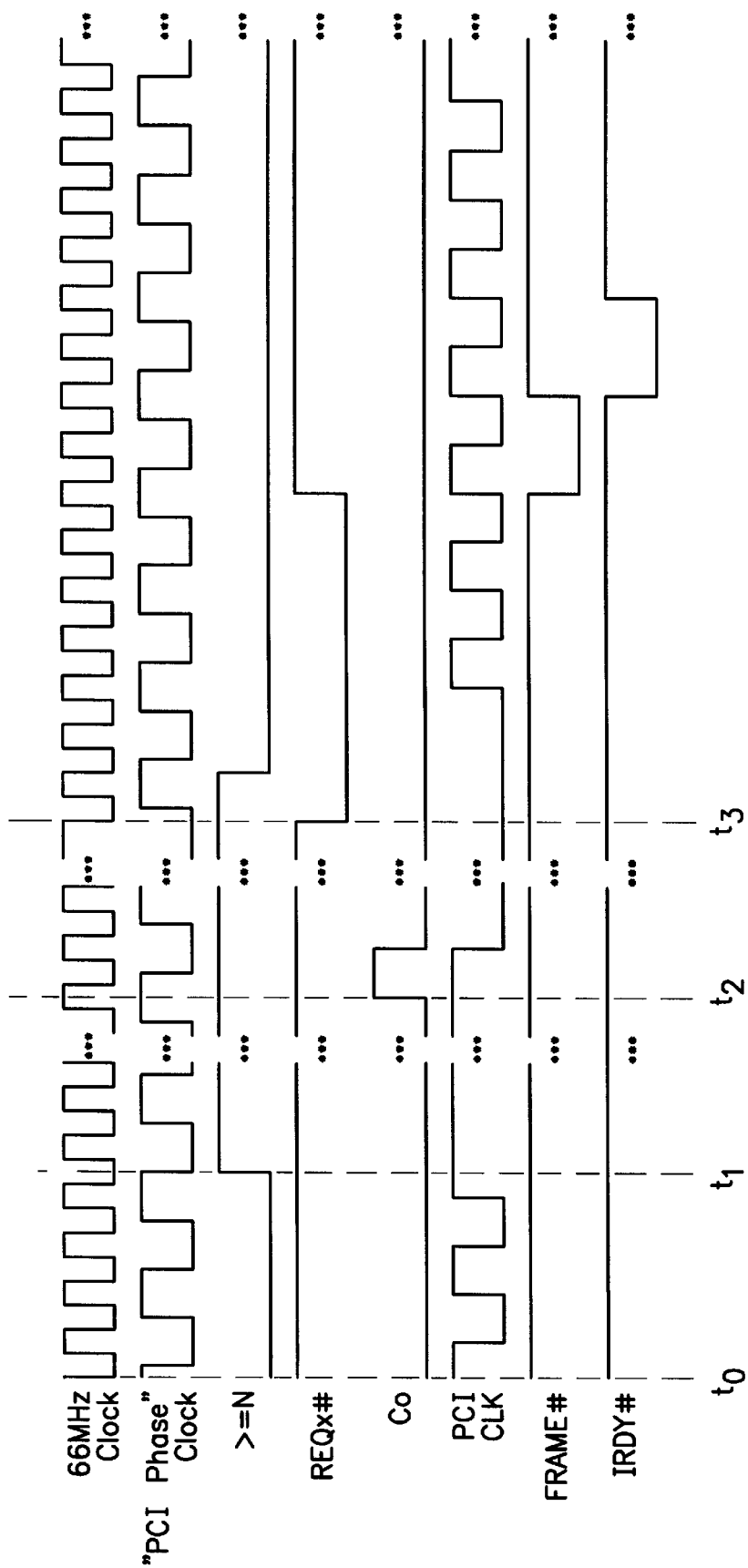
FIG. 5 is a timing diagram depicting the state of signals shown in the embodiment of FIG. 4.

The operation of the apparatus of FIG. 4 will next be described in conjunction with the timing diagram of FIG. 5. At time to, both the FRAME# and IRDY# signals on the bus have been in a deasserted state (i.e., at a high or "1" level) for some amount of time. Also, each of the REQ# signals (i.e., REQ#–REQN# or REQx#) are deasserted. The deassertion of FRAME#, IRDY#, and REQx# signals is an indication on the bus that the bus is idle. As seen from FIG. 4, if all of these signals (excluding the "ENABLE" signal described below) are deasserted or at a "1" level, then the output of the AND gate is a "1" value which is coupled to the Clear input of counter 62 (the circle between the AND gate 61 and the counter 62 indicates that the Clear input is a low-asserted input). Since the Clear input of the counter 62 is not asserted, the counter is free to increment its count as long as it is enabled and it receives a clock signal.

At time $t_0$, it is assumed that the count has not reached the value N. Therefore, the output of the comparator 63 is at a "0" level which is supplied to the Enable (EN) input of the Counter (another low-asserted input), thus enabling the counter to increment its count upon receiving a clock pulse signal at its Clk input. The "0" output from the comparator selects the "0" inputs of the first and second multiplexers 51, 53. Therefore, the J input of the flip-flop 54 receives the "PCI Phase" signal (which runs at a constant frequency of 33 MHZ) and the K input of the flip=flop 54 receives the value "1." When the "PCI Phase" signal is in a low state, a clock pulse signal from the 66 MHZ Clock causes the Q output to be cleared (or at a "0" level) and the Q output to be set (or at a "1" level). The inverters 70a, 70b, . . . , 70n invert this signal to provide a "0" output. When the "PCI Phase" signal changes to a high state, a clock pulse signal from the 66 MHZ Clock causes the Q output to be inverted from its previous state (i.e., it changes to a "1" level). The Q output is also inverted to a "0" value. The inverters 70a, 70b, and 70n invert this signal to provide a "1" output. Accordingly, while the output of the comparator 63 is in a low state, the output of the inverters (i.e., the PCI CLK signals) will be a clock signal having the same frequency has the "PCI Phase" signal.

The output of inverter 70n clocks the counter 62. Once the counter has reached the value N, comparator 63 outputs a "1" value (see time $t_1$ in FIG. 5). This causes the EN input of the counter 62 to go to a high state which disables the counter and prevents it from incrementing its output. The "1" output of the comparator 63 selects the "1" inputs of the first and second multiplexers 51, 53. Accordingly, the J input and K input of the flip-flop 54 receive the output Co of the 5-bit counter 52. Assuming that the output Co is "0" at time $t_1$, the outputs (both Q and Q) of the flip-flop 54 remain the same, and the PCI CLK output of the inverters 70a, 70b, . . . , 70n stays at its current state (in this case at a "1" level. When the 5-bit counter 52 transitions from 11111 to 00000, the Co output goes to a high level for one cycle of the 66 MHZ clock (see time $t_2$ in FIG. 5). At this time the J and K inputs of the flip-flop 54 go to a "1" level which inverts the Q and Q outputs and inverts the PCI CLK output to a low value. Each time a pulse is generated at Co by the counter 52, the PCI CLK signal will be inverted. Accordingly, until the output of the AND gate 61 becomes "0," the PCI CLK signal will have a frequency dictated by the frequency of the Co signal.

Figure 1:
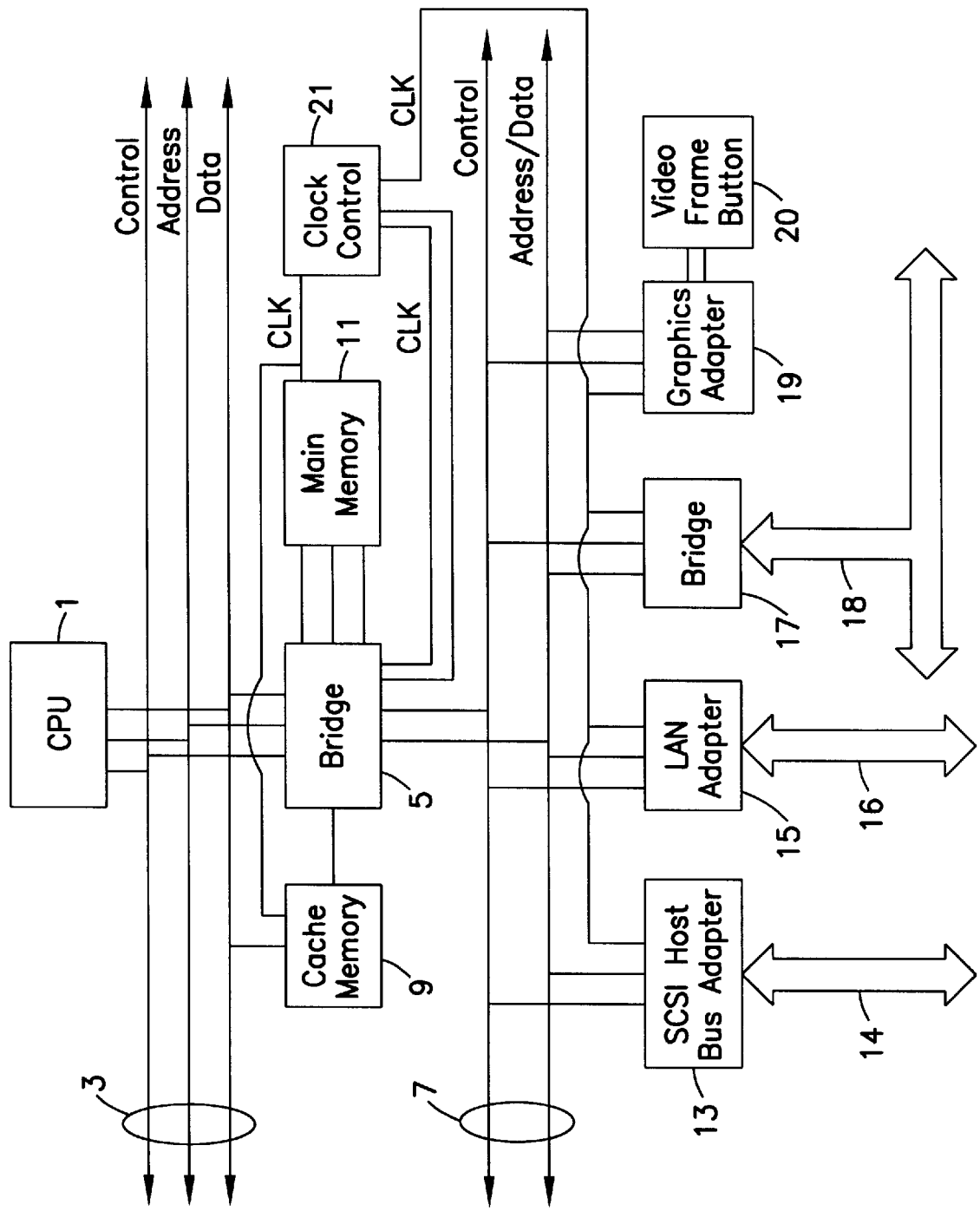
FIG. 1 is a block diagram of a PCI system as known in the art.

The bus will remain idle and the PCI CLK will maintain a lower frequency (commensurate with Co) until a REQ# signal is asserted by any bus master component coupled to the bus. At time $t_3$, a REQ# signal is asserted by a bus master component. In doing so, the output of the AND gate becomes a "0" value supplied to the Clear input of the counter, thus clearing the counter 62. Since the counter value is now zero, the output of the comparator 63 becomes "0" and the EN input goes to a "1" level (enabling the Counter which remains zeroed until the output of the AND gate 61 returns to a "1" value). The "0" output of the comparator 63 selects the "0" inputs of the first and second multiplexers 51, 53. The J input of the flip-flop 54 becomes the "PCI Phase" signal and the K input becomes a "1" value. If the "PCI Phase" signal is at a low level then the Q output of the flip-flop will be low, the Q output will be high and PCI CLK will be at a low level. If the "PCI Phase" signal is at a high level, then the Q output of the flip-flop will be inverted to a high level, the Q output will be at a low level and PCI CLK will be at a high level. Thus, while the output of the comparator remains low, the PCI CLK will run at a frequency equal to the frequency of the "PCI Phase" signal. Furthermore, the phase relationship of PCI CLK and the "PCI Phase" signal remains the same at this point as at time $t_0$. Thus, the circuit of the present invention insures that all minimum pulse widths are met and that all clock edges are monotonic. The circuit of the present invention can be used with a fully synchronous north bridge circuit (see FIG. 1) since the lower frequency clock is in-phase and a divided down version of the normal PCI CLK signal.

After the bus master component asserting the REQ# signal receives a GNT# (Grant) signal from the bus arbiter (not shown), the bus master then asserts the FRAME# signal for a typical transaction on the PCI bus (assuming that the bus is idle with FRAME# and IRDY# deasserted). After the transaction on the PCI bus is completed, the REQ#, FRAME#, and IRDY# signals will be in a deasserted state indicating that the bus is idle. The output of the AND gate 61 goes to a high value and the Clear input of the Counter becomes "0" allowing the Counter 62 to increment its count. After the counter reaches the value N, the clock PCI CLK will automatically be changed to the lower frequency commensurate with the Co output of the 5-bit counter 52 (as described above with reference to time $t_1$ in FIG. 5).

If desired, the apparatus of FIG. 4 can be enabled/disabled by a single input (e.g., "ENABLE") input to the AND gate 61. If the ENABLE signal is asserted (i.e., at a "1" value) then the output of the AND gate 61 will remain at "1" unless a REQ# signal, the FRAME# signal, or the IRDY# signal is asserted low. If the ENABLE signal is not asserted (i.e., at a "0" value), then the output of the AND gate will always be "0," the counter 62 will remain in a clear state, the output of the comparator 63 will be "0" and the PCI CLK will be running at the same frequency as the "PCI Phase" signal.

The apparatus and method of the present invention allow for dynamically controlling clock speed for a bus and allows the system to run the clock at a very slow rate except for times when the bus is actually in use. This provides improved power savings for the devices receiving the clock signals generated according to the invention.

The values for N in the comparator 63 and the counter 52 are optimally chosen for the system in which they reside. The value for the counter 52 preferably depends upon the latency which can be transparently absorbed by that system (the PCI Mobile Design Guide referenced above recommends a minimum bus frequency of 32 KHz). In the embodiment shown in FIG. 4, the 5-bit counter 52 is clocked by the 66 MHZ clock and a pulse signal will appear at the output Co for every 32 pulses received causing the PCI CLK signal to switch from high to low or from low to high. Thus, the lower frequency provided by the variable-speed clock supply 41 is approximately 1 MHZ. A 10-bit counter would yield a value of approximately 32 KHz. For a PCI bus, the PCI specification requires the REQ# signal to be asserted synchronously with the PCI CLK signal. As the PCI clock slows down, the acquisition latency for the PCI bus master component goes up. Since heavily loaded PCI busses can exhibit in excess of 4 microseconds latency, a slow clock of 1 MHZ (which has a 1 microsecond period) during bus idle times should not cause any problems in most systems.

The selection of the value for N in the comparator 63 can also be system-dependent. For a mobile system, N is preferably chosen as 32 or between 16 and 64. For a desk-top system, a higher value should be set such as 4096.

One skilled in the art will appreciate that many substitutions of the specific components in the circuit of FIG. 4 are available. For example, the variable-speed clock supply 41 can be replaced by two different crystal sources that are used to supply clocking signals for the PCI bus. If the value of N is chosen as a power of 2 (i.e., 2, 4, 8, 16, etc.) then a specific bit of the counter can be used to indicate that the value for N has been met or exceeded. For example, if N is 32 and the counter 62 is an 8-bit counter then bit 6 of the counter 62 could be used instead of the comparator 63. If the values for N in the comparator 63 and counter 52 are loaded from registers or the like, then these values can be changed as needed by the user or through the Basic Input/Output System (BIOS) software that is provided with most computer systems by the Original Equipment Manufacturer (OEM).

The present invention can also be used with busses operating according to protocols other than the PCI architecture. Whenever an idle condition appears on the bus, that condition is detected by the idle detector/timer component 43 which causes the clock supply 41 to lower the frequency of the bus clock to an acceptable level. When the idle condition on the bus changes to an active condition (i.e., a bus component seeks to use the bus), the idle detector/timer 43 senses that condition and signals the variable-speed clock supply to increase the frequency of the bus clock.

What is claimed is:

1. In a system having a bus and a plurality of bus components coupled to said bus, each of said bus components adapted to receive clocking signals from a clock control system, said clock control system comprising:

an idle detector/timer circuit detecting an idle condition on said bus and outputting a first control signal indicating said idle condition after a predetermined amount of time has elapsed after said idle condition appears on said bus, said idle detector/timer circuit comprises a first counter, such that said idle detector/timer circuit outputs said first control signal after said idle condition appears on the bus and said counter receives a predetermined number of clocking signals from a variable-speed clock supply circuit, wherein said bus operates according to the Peripheral Component Interconnect (PCD) architecture and an active condition appears on said bus when said idle detector/timer circuit receives a REQ# signal from one of said bus components coupled to said bus and said idle condition appears on said bus when FRAME# and IRDY# signals on said bus are deasserted; and a variable-speed clock supply circuit coupled to said idle detector circuit and receiving said first control signal, said variable-speed clock supply circuit supplying clocking signals to said bus components coupled to said bus at a first frequency and a second frequency where said second frequency is lower than said first frequency, such that said variable-speed clock supply circuit supplies said clocking signal at said second frequency in response to said first control signal, wherein said variable-speed clock supply includes a first multiplexer having a control input coupled to said idle detector/timer, a first input coupled to a 33 MHZ clocking signal source and a second input coupled to an output of a second counter, said second counter having an input coupled to a 66 ME clocking signal source and outputting a pulse signal when said counter reaches a predetermined value;

a second multiplexer having a control input coupled to said idle detector/timer, a first input receiving a binary "t" value and a second input coupled to the output of said second counter; and a JK-type flip-flop having a J input, a K input, a clock input, and an output, said J input coupled to the output of said first multiplexer, said K input coupled to the output of said second multiplexer, and said clock input coupled to said 66 MHZ clocking signal source, said JK-type flip-lop outputting said clocking signal for said bus.

2. The dynamic clock control system of claim 1, wherein said bus operates according to the Peripheral Component Interconnect (PCI) architecture, said predetermined value of said second counter is a power of 2, and said clocking signals output by said variable-speed clock supply at said first frequency are in phase with said clocking signals output by said variable-speed clock supply at said second frequency.

* * * * *

UNITED STATES PATENT AND TRADEMARK OFFICE
CERTIFICATE OF CORRECTION

PATENT NO. : 6,079,022
DATED : June 20, 2000
INVENTOR(S) : Bruce Young

It is certified that error appears in the above-identified patent and that said Letters Patent is hereby corrected as shown below:

| | |
|---|---|
| Column 2, line 16 | "fall" should be --full-- |
| Column 2, line 24 | "fill" should be --full-- |
| Column 3, line 55 | "also" should be deleted |
| Column 4, line 48 | "to" should be --$t_0$-- |
| Column 8, line 16 | "ME" should be --MHZ-- |
| Column 8, line 21 | "t" should be --1-- |
| Column 8, line 28 | "lop" should be --flop-- |

Signed and Sealed this

Eighth Day of May, 2001

Attest:

NICHOLAS P. GODICI

Attesting Officer          Acting Director of the United States Patent and Trademark Office